United States Patent
Wang

(10) Patent No.: US 12,409,838 B2
(45) Date of Patent: Sep. 9, 2025

(54) HILL STOP CONTROL METHOD AND APPARATUS FOR FOUR-WHEEL DRIVE VEHICLE, AND SYSTEM AND VEHICLE

(71) Applicant: GREAT WALL MOTOR COMPANY LIMITED, Baoding (CN)

(72) Inventor: Jian Wang, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 98 days.

(21) Appl. No.: 18/681,880

(22) PCT Filed: Jun. 21, 2022

(86) PCT No.: PCT/CN2022/100092
§ 371 (c)(1),
(2) Date: Feb. 7, 2024

(87) PCT Pub. No.: WO2023/016092
PCT Pub. Date: Feb. 16, 2023

(65) Prior Publication Data
US 2024/0343252 A1 Oct. 17, 2024

(30) Foreign Application Priority Data
Aug. 9, 2021 (CN) .......................... 202110909179.2

(51) Int. Cl.
*B60W 30/18* (2012.01)
*B60W 10/06* (2006.01)

(52) U.S. Cl.
CPC ...... *B60W 30/18118* (2013.01); *B60W 10/06* (2013.01); *B60W 2540/12* (2013.01); *B60W 2552/15* (2020.02)

(58) Field of Classification Search
CPC ........... B60W 30/18118; B60W 10/06; B60W 2540/12; B60W 2552/15; B60T 8/1769
See application file for complete search history.

(56) References Cited

U.S. PATENT DOCUMENTS 5,918,953 A * 7/1999 Nihei .................... B60T 8/1769
303/190
9,278,693 B2 * 3/2016 Perkins .................. B60T 8/172
(Continued)

FOREIGN PATENT DOCUMENTS

| CN | 106402371 A | 2/2017 |
| CN | 107336700 A | 11/2017 |

(Continued)

*Primary Examiner* — George C Jin
(74) *Attorney, Agent, or Firm* — Bayramoglu Law Offices LLC

(57) ABSTRACT

A hill stop control method includes: when it is determined that a vehicle is in a park brake state, determining, by acquiring the current parameter of the vehicle, whether the vehicle is in a working condition of being prone to sliding; and when it is determined that the vehicle is in a working condition of being prone to sliding, controlling a mode switch of a transfer case to switch the current drive mode to a high-speed four-wheel drive mode having a stronger brake force or a low-speed drive mode. In this way, the automatic switching of a drive mode is realized without changing a brake system; and when stopped on a hill, friction forces between tires and the ground are increased, thereby effectively reducing the risk of sliding down a hill.

15 Claims, 3 Drawing Sheets

(56) References Cited

U.S. PATENT DOCUMENTS

| | | | |
|---|---|---|---|
| 2003/0221881 A1* | 12/2003 | Lee | B60W 30/18118 |
| | | | 903/917 |
| 2007/0129871 A1* | 6/2007 | Post, II | B60K 28/165 |
| | | | 180/197 |
| 2009/0063000 A1* | 3/2009 | Kodama | B60W 30/16 |
| | | | 701/75 |
| 2017/0361847 A1* | 12/2017 | Marutani | B60W 30/18118 |
| 2023/0013377 A1* | 1/2023 | Horiguchi | B60W 50/10 |
| 2024/0059289 A1* | 2/2024 | Song | B60W 30/18009 |

FOREIGN PATENT DOCUMENTS

| | | |
|---|---|---|
| CN | 109591621 A | 4/2019 |
| CN | 111890949 A | 11/2020 |
| JP | 2001287557 A | 10/2001 |

\* cited by examiner

HILL STOP CONTROL METHOD AND APPARATUS FOR FOUR-WHEEL DRIVE VEHICLE, AND SYSTEM AND VEHICLE

CROSS REFERENCE TO THE RELATED APPLICATIONS

This application is the national phase entry of International Application No. PCT/CN2022/100092, filed on Jun. 21, 2022, which is based upon and claims priority to Chinese Patent Application No. 202110909179.2, filed on Aug. 9, 2021, the entire contents of which are incorporated herein by reference.

TECHNICAL FIELD

The disclosure relates to the technical field of automobiles, in particular to a hill stop control method, apparatus and system for a four-wheel drive vehicle, and a vehicle.

BACKGROUND

A transfer case is an important component of a power system of a four-wheel drive vehicle, and its main function is to distribute power outputted by the power system to front and rear drive shafts to realize four-wheel drive of a vehicle. The transfer case usually includes a high-speed drive mode and a low-speed drive mode, wherein the high-speed drive mode includes a high-speed four-wheel drive mode and a high-speed two-wheel drive mode, and the low-speed drive mode includes a low-speed four-wheel drive mode.

In daily use of the four-wheel drive vehicle, the high-speed two-wheel drive mode is mostly used. A vehicle is at risk of sliding down a hill due to braking rear wheels only by using an electrical park brake (EPB) or a hand brake when the vehicle is in a high-speed two-wheel drive mode and is parked on a road surface having a certain slope.

SUMMARY

The disclosure provides a hill stop control method, apparatus and system for a four-wheel drive vehicle, and a vehicle to solve the problem of a vehicle being at risk of sliding down a hill due to braking rear wheels only by using an EPB or a hand brake when a four-wheel drive vehicle is in a high-speed two-wheel drive mode and is parked on a road surface having a certain slope.

In order to solve the above-mentioned problem, the disclosure adopts the following technical solutions:

In a first aspect, an embodiment of the disclosure provides a vehicle drift control method, and the method includes:
when it is determined that a vehicle is in a park brake state, acquiring the current parameter of the vehicle;
according to the current parameter, determining whether the vehicle is in a working condition of being prone to sliding; and
when it is determined that the vehicle is in the working condition of being prone to sliding, controlling a mode switch of a transfer case to switch the current drive mode to a high-speed four-wheel drive mode or a low-speed drive mode.

In an embodiment of the disclosure, the current parameter includes an engine state of the vehicle, the current drive mode of the transfer case, a transmission gear, a slope of a parking position, and a speed of sliding down a hill;
the when it is determined that the vehicle is in the working condition of being prone to sliding, controlling a mode switch of a transfer case to switch the current drive mode to a high-speed four-wheel drive mode or a low-speed drive mode includes:
in the case that an engine is in a flameout state, when conditions that the current drive mode is a high-speed two-wheel drive mode, the transmission gear is on a neutral (N)/parking (P) gear, and the slope is greater than a slope threshold are satisfied at the same time, determining that the vehicle is in the working condition of being prone to sliding, and controlling the mode switch of the transfer case to switch the high-speed two-wheel drive mode to the high-speed four-wheel drive mode or the low-speed drive mode; and
in the case that the engine is in a non-flameout state, when conditions that the current drive mode is the high-speed two-wheel drive mode, the transmission gear is on the N/P gear, the slope is greater than the slope threshold, and the speed of sliding down a hill is higher than a speed threshold are satisfied at the same time, determining that the vehicle is in the working condition of being prone to sliding, and controlling the mode switch of the transfer case to switch the high-speed two-wheel drive mode to the high-speed four-wheel drive mode or the low-speed drive mode.

In an embodiment of the disclosure, after the when conditions that the current drive mode is a high-speed two-wheel drive mode, the transmission gear is on an N/P gear, and the slope is greater than a slope threshold are satisfied at the same time, determining that the vehicle is in the working condition of being prone to sliding, and controlling the mode switch of the transfer case to switch the high-speed two-wheel drive mode to the high-speed four-wheel drive mode or the low-speed drive mode, the method further includes:
after the vehicle is electrified, determining whether the engine is restarted; and
after it is determined that the engine is restarted, prompting, by an instrument unit, that the current vehicle is in the high-speed four-wheel drive mode or the low-speed drive mode.

In an embodiment of the disclosure, the when conditions that the current drive mode is the high-speed two-wheel drive mode, the transmission gear is on an N/P gear, the slope is greater than the slope threshold, and the speed of sliding down a hill is higher than a speed threshold are satisfied at the same time, determining that the vehicle is in the working condition of being prone to sliding, and controlling the mode switch of the transfer case to switch the high-speed two-wheel drive mode to the high-speed four-wheel drive mode or the low-speed drive mode includes:
when the conditions that the current drive mode is the high-speed two-wheel drive mode, the transmission gear is on the N/P gear, the slope is greater than the slope threshold, and the speed of sliding down a hill is higher than the speed threshold are satisfied at the same time, determining, within a preset time, whether a signal that a brake pedal is triggered is received; and
when the signal that the brake pedal is triggered is not received within the preset time, controlling the mode switch of the transfer case to switch the high-speed two-wheel drive mode to the high-speed four-wheel drive mode or the low-speed drive mode, and prompting, by the instrument unit, that the current vehicle is in the high-speed four-wheel drive mode or the low-speed drive mode.

In an embodiment of the disclosure, after the conditions that the current drive mode is the high-speed two-wheel drive mode, the transmission gear is on the N/P gear, the slope is greater than the slope threshold, and the speed of sliding down a hill is higher than the speed threshold are satisfied at the same time, and before it is determined whether the signal that the brake pedal is triggered is received, the method further includes:

giving a caution for sliding down a hill by the instrument unit so as to remind a driver of preforming the brake operation.

In an embodiment of the disclosure, the method further includes:

when it is determined that the vehicle is in the park brake state, acquiring current weather information; and when conditions that the current weather information indicates a weather of being prone to sliding, and the current drive mode is the high-speed two-wheel drive mode are satisfied at the same time, determining that the vehicle is in the working condition of being prone to sliding, and controlling the mode switch of the transfer case to switch the high-speed two-wheel drive mode to the high-speed four-wheel drive mode or the low-speed drive mode.

In a second aspect, based on the same inventive concept, an embodiment of the disclosure provides a hill stop control apparatus for a four-wheel drive vehicle, wherein the apparatus includes:

an acquisition module configured to, when it is determined that a vehicle is in a park brake state, acquire the current parameter of the vehicle;

a determination module configured to, according to the current parameter, determine whether the vehicle is in a working condition of being prone to sliding; and a switching module configured to, when it is determined that the vehicle is in the working condition of being prone to sliding, control a mode switch of the transfer case to switch the current drive mode to a high-speed four-wheel drive mode or a low-speed drive mode.

In an embodiment of the disclosure, the switching module includes:

a first switching sub-module configured to, in the case that an engine is in a flameout state, when conditions that the current drive mode is a high-speed two-wheel drive mode, the transmission gear is on an N/P gear, and the slope is greater than a slope threshold are satisfied at the same time, determine that the vehicle is in the working condition of being prone to sliding, and control the mode switch of the transfer case to switch the high-speed two-wheel drive mode to the high-speed four-wheel drive mode or the low-speed drive mode; and a second switching sub-module configured to, in the case that the engine is in a non-flameout state, when conditions that the current drive mode is the high-speed two-wheel drive mode, the transmission gear is on the N/P gear, the slope is greater than the slope threshold, and the speed of sliding down a hill is higher than a speed threshold are satisfied at the same time, determine that the vehicle is in the working condition of being prone to sliding, and control the mode switch of the transfer case to switch the high-speed two-wheel drive mode to the high-speed four-wheel drive mode or the low-speed drive mode.

In an embodiment of the disclosure, the second switching sub-module includes:

a determination sub-module configured to, when the conditions that the current drive mode is the high-speed two-wheel drive mode, the transmission gear is on the N/P gear, the slope is greater than the slope threshold, and the speed of sliding down a hill is higher than the speed threshold are satisfied at the same time, determine, within a preset time, whether a signal that a brake pedal is triggered is received; and a switching sub-module configured to, when the signal that the brake pedal is triggered is not received within the preset time, control the mode switch of the transfer case to switch the high-speed two-wheel drive mode to the high-speed four-wheel drive mode or the low-speed drive mode, and prompt, by an instrument unit, that the current vehicle is in the high-speed four-wheel drive mode or the low-speed drive mode.

In an embodiment of the disclosure, the second switching sub-module further includes:

a caution giving sub-module configured to, after the conditions that the current drive mode is the high-speed two-wheel drive mode, the transmission gear is on the N/P gear, the slope is greater than the slope threshold, and the speed of sliding down a hill is higher than the speed threshold are satisfied at the same time, and before it is determined whether the signal that the brake pedal is triggered is received, give a caution for sliding down a hill by the instrument unit so as to remind the driver of preforming the brake operation.

In an embodiment of the disclosure, the apparatus further includes:

a second determination module configured to, after the vehicle is electrified, determine whether the engine is restarted; and a prompt module configured to, after it is determined that the engine is restarted, prompt, by the instrument unit, that the current vehicle is in the high-speed four-wheel drive mode or the low-speed drive mode.

In an embodiment of the disclosure, the hill stop control apparatus for the four-wheel drive vehicle further includes:

a weather acquisition module configured to, when it is determined that the vehicle is in the park brake state, acquire current weather information; and a second switching module configured to, when conditions that the current weather information indicates a weather of being prone to sliding, and the current drive mode is the high-speed two-wheel drive mode are satisfied at the same time, determine that the vehicle is in the working condition of being prone to sliding, and control the mode switch of the transfer case to switch the high-speed two-wheel drive mode to the high-speed four-wheel drive mode or the low-speed drive mode.

In a third aspect, an embodiment of the disclosure provides a hill stop control system for a four-wheel drive vehicle, wherein the system includes:

a transfer case control unit as well as a mode switch of a transfer case and a parameter acquisition apparatus which are respectively connected to the transfer case control unit, wherein the mode switch of the transfer case is configured to switch a drive mode of the transfer case and transmit the current drive mode to the transfer case control unit, wherein the drive mode includes a high-speed two-wheel drive mode, a high-speed four-wheel drive mode and a low-speed drive mode;

the parameter acquisition apparatus is configured to acquire the current parameter of a vehicle and transmit the current parameter to the transfer case control unit; and the transfer case control unit is configured to receive the current parameter of the vehicle and perform the hill stop control method for the four-wheel drive vehicle provided according to the first aspect of the disclosure so as to, when it is determined that the vehicle is in a working condition of being prone to sliding, control the mode switch of the transfer case to switch the current drive mode to the high-speed four-wheel drive mode or the low-speed drive mode.

In an embodiment of the disclosure, the parameter acquisition apparatus includes:

an electronic stability program, a transmission control unit and an engine control unit which are respectively connected to the transfer case control unit, wherein:

the electronic stability program is configured to acquire slope information of a parking position of the vehicle and a speed of sliding down a hill and transmit the slope information and the speed of sliding down a hill to the transfer case control unit;

the transmission control unit is configured to acquire a transmission gear of the vehicle and transmit the transmission gear to the transfer case control unit; and the engine control unit is configured to acquire an engine state of the vehicle and transmit the engine state to the transfer case control unit.

In an embodiment of the disclosure, the system further includes:

an instrument unit and a weather acquisition unit which are connected to the transfer case control unit, wherein the weather acquisition unit is configured to acquire weather information and transmit the weather information to the transfer case control unit;

the transfer case control unit is configured to receive the weather information, and when conditions that the current drive mode is the high-speed two-wheel drive mode and the current weather information indicates a weather of being prone to sliding are satisfied at the same time, send an instruction of switching the high-speed two-wheel drive mode to the high-speed four-wheel drive mode or the low-speed drive mode to the mode switch of the transfer case; is further configured to, when the conditions that the current drive mode is the high-speed two-wheel drive mode, the transmission gear is on the N/P gear, and the slope is greater than the slope threshold are satisfied at the same time, and the engine is restarted after the high-speed two-wheel drive mode is switched to the high-speed four-wheel drive mode or the low-speed drive mode, transmit a prompt instruction to the instrument unit; and is further configured to, after the conditions that the current drive mode is the high-speed two-wheel drive mode, the transmission gear is on the N/P gear, the slope is greater than the slope threshold, and the speed of sliding down a hill is higher than the speed threshold are satisfied at the same time, and before it is determined whether a signal that a brake pedal is triggered is received, transmit an instruction of giving a caution for sliding down a hill to the instrument unit; and the instrument unit is configured to receive the prompt instruction and perform prompt operation according to the prompt instruction so as to prompt that the current vehicle is in the high-speed four-wheel drive mode; and is further configured to receive the instruction of giving a caution for sliding down a hill and perform a caution operation according to the instruction of giving a caution for sliding down a hill so as to remind the driver of performing brake operation.

In a fourth aspect, an embodiment of the disclosure provides a vehicle at least including the hill stop control system for the four-wheel drive vehicle provided in the third aspect of the embodiment of the disclosure.

Compared with the prior art, the disclosure includes the following advantages:

in an embodiment of the disclosure, the method includes: when it is determined that a vehicle is in a park brake state, determining, by acquiring the current parameter of the vehicle, whether the vehicle is in a working condition of being prone to sliding; and when it is determined that the vehicle is in the working condition of being prone to sliding, controlling a mode switch of a transfer case to switch the current drive mode to a high-speed four-wheel drive mode having a stronger brake force or a low-speed drive mode. In this way, the automatic switching of a drive mode is realized without changing a brake system; and when stopped on a hill, friction forces between tires and the ground are increased, thereby effectively reducing the risk of sliding down a hill.

BRIEF DESCRIPTION OF THE DRAWINGS

In order to describe the technical solutions in the embodiments of the disclosure or the prior art more clearly, the accompanying drawings required for describing the embodiments or the prior art will be briefly introduced below. Apparently, the accompanying drawings in the following description show only some embodiments of the disclosure, and those of ordinary skill in the art may still derive other accompanying drawings from these accompanying drawings without creative efforts.

Figure 1:
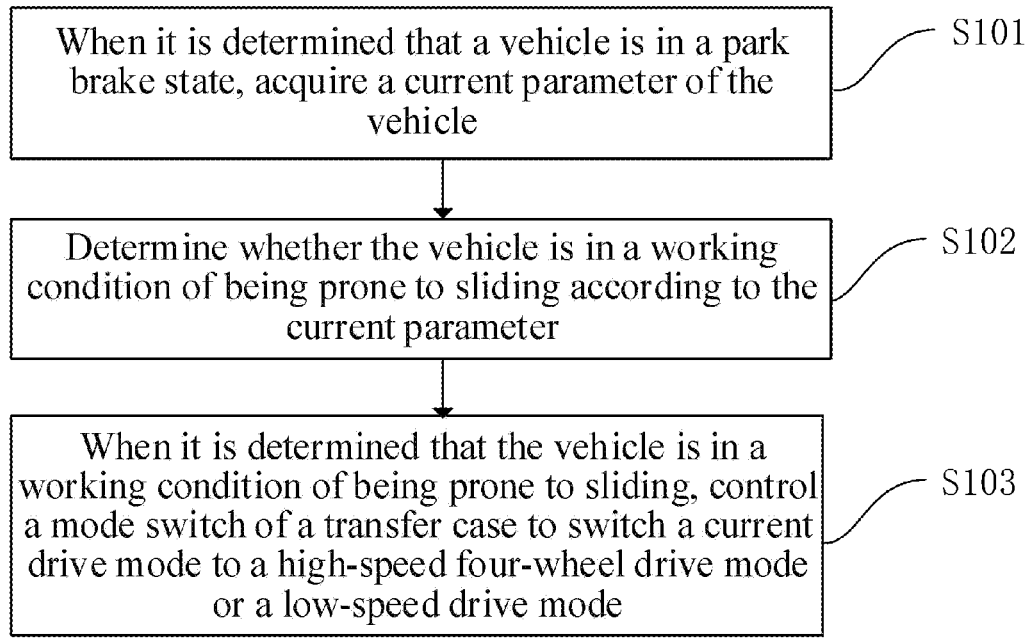
FIG. 1 is a step flow diagram of a hill stop control method for a four-wheel drive vehicle in an embodiment of the disclosure.

Reference numerals in the accompanying drawings: 200—hill stop control apparatus for four-wheel drive vehicle; 201—acquisition module; 202—determination module; 203—switching module; 300—hill stop control system for four-wheel drive vehicle; 301—transfer case control unit; 302—electronic stability program; 303—transmission control unit; 304—engine control unit; 305—mode switch of transfer case; 306—instrument unit; and 307—weather acquisition unit.

DETAILED DESCRIPTION OF THE EMBODIMENTS

The technical solutions in embodiments of the disclosure will be described clearly and completely below in conjunction with the accompanying drawings in the embodiments of the disclosure. Apparently, the described embodiments are only a part of the embodiments of the disclosure, but not all of the embodiments. Based on the embodiments of the disclosure, all other embodiments obtained by those of ordinary skill in the art without creative efforts shall fall within the protection scope of the disclosure.

In view of the technical problem provided in the background of the disclosure, an embodiment of the disclosure provides a hill stop control method for a four-wheel drive vehicle, which aims at realizing the automatic switching of a drive mode without changing a brake system when the current parameter is in a state that a vehicle is prone to sliding down a hill by detecting the current parameter of the vehicle in real time when the vehicle is stopped on a hill, and a high-speed two-wheel drive mode with a weaker brake force is switched to a high-speed four-wheel drive mode or a low-speed drive mode with a stronger brake force, so that friction forces between tires and the ground are increased, thereby effectively reducing the risk of sliding down a hill.

With reference to FIG. 1 which shows a hill stop control method for a four-wheel drive vehicle in the disclosure, the method may include the following steps:

Step S101, when it is determined that a vehicle is in a park brake state, the current parameter of the vehicle is acquired.

In the present implementation, it should be noted that the current parameter includes an engine state of the vehicle, the current drive mode of a transfer case, a transmission gear, a slope of a parking position, and a speed of sliding down a hill, wherein the drive mode includes a high-speed two-wheel drive mode, a high-speed four-wheel drive mode, and a low-speed drive mode, and the speed of sliding down a hill refers to speeds of front wheels.

In the present implementation, it should be further noted that the transfer case usually includes a high-speed drive mode and a low-speed drive mode, the high-speed drive mode includes a high-speed four-wheel drive mode (hereinafter referred to as a 4H mode) and a high-speed two-wheel drive mode (hereinafter referred to as a 2H mode), and the low-speed drive mode includes a low-speed four-wheel drive mode (hereinafter referred to as a 4L mode), wherein when being in the 4H mode, the transfer case may rigidly lock front and rear output shafts and output a torque at a ratio of one to one, so that the vehicle is stably driven under a complex road, such as a muddy area and a sandy area, and the power stability of the vehicle is improved; when being in the 4L mode, the transfer case may also rigidly lock the front and rear output shafts and amplify the outputted torque of a transmission by two point five times or above, and in the case that the vehicle cannot be driven, for example, it is in deep mud, the 4L mode is usually adopted for getting out of trouble; and when the vehicle is driven on a more smooth road, the transfer case may be in the 2H mode, so that the vehicle has a higher speed. Therefore, when the vehicle stops on a hill, the transfer case is in a locking mode in both of the 4H mode and the 4L mode so as to be capable of inhibiting the rolling the front wheels. Therefore, brake forces of the vehicle in the 4H mode and the 4L mode are both obviously stronger than the brake force of the vehicle in the 2H mode.

Step S102, according to the current parameter, it is determined whether the vehicle is in a working condition of being prone to sliding.

In the present implementation, in view of a vehicle being at risk of sliding down a hill due to braking rear wheels only by using an EPB or a hand brake when a four-wheel drive vehicle in the 2H mode is parked on a road surface having a certain slope, it may be accurately determined, by combining with the engine state of the vehicle, the current drive mode of the transfer case, the transmission gear, the slope of the parking position, and the speed of sliding down a hill in the current parameter of the vehicle, whether the vehicle is in the working condition of being prone to sliding.

Step S103, when it is determined that the vehicle is in the working condition of being prone to sliding, a mode switch of a transfer case is controlled to switch the current drive mode to a high-speed four-wheel drive mode or a low-speed drive mode.

In the present implementation, when it is determined that the vehicle is in the working condition of being prone to sliding, the mode switch of the transfer case is controlled to switch the current drive mode to a high-speed four-wheel drive mode having a stronger brake force or a low-speed drive mode. In this way, the automatic switching of a drive mode can be realized without changing a brake system; and when stopped on a hill, friction forces between tires and the ground are increased, thereby effectively reducing the risk of sliding down a hill.

In a feasible implementation, step S103 may include the following specific steps:

step S103-1, in the case that an engine is in a flameout state, when conditions that the current drive mode is a high-speed two-wheel drive mode, the transmission gear is on a neutral (N)/parking (P) gear, and the slope is greater than a slope threshold are satisfied at the same time, it is determined that the vehicle is in the working condition of being prone to sliding, and the mode switch 305 of the transfer case is controlled to switch the high-speed two-wheel drive mode to the high-speed four-wheel drive mode or the low-speed drive mode.

In the present implementation, a driving intention of a driver may be known by determining whether the transmission gear is on the N/P gear. When the transmission gear is on a drive (D) gear, it is proven that the driver only stops the vehicle temporarily, and it is unnecessary to switch the drive mode; and when the transmission gear is on the N/P gear, it is proven that the driver has left the vehicle or needs to stop on a hill for a long time. At the moment, if the current drive mode is the high-speed two-wheel drive mode and a slope of a position of the vehicle stopped on a hill is greater than the slope threshold, the vehicle will be at risk of sliding down a hill; and when above three conditions are satisfied at the same time, the mode switch 305 of the transfer case is controlled to automatically switch the high-speed two-wheel drive mode to the high-speed four-wheel drive mode or the low-speed drive mode, so that friction forces between tires and the ground are increased, thereby effectively reducing the risk of sliding down a hill.

In the present implementation, the mode switch 305 of the transfer case may be physical or virtual, and when being a virtual button, the mode switch 305 of the transfer case may be disposed on a display screen of the vehicle or a position such as a steering wheel that is suitable for the driver to operate. The form and position of the mode switch 305 of the transfer case are not specifically limited in the present implementation.

In the present implementation, preferably, the slope threshold may be set to be thirty percent.

In an example, when driving the four-wheel drive vehicle for off-road driving in the high-speed two-wheel drive mode, the driver needs to park on a ramp with a slope of thirty-five percent to perform operation such as road exploration, vehicle chassis confirmation or maintenance. After pulling up an electronic parking brake (EPB) switch, putting the transmission gear on the N/P gear and flaming out the engine, the driver gets off the vehicle. At the moment, in the present embodiment, the current slope of the position of the vehicle stopped on a hill may be acquired by an electronic stability program (ESP), and after it is determined that the current slope has been greater than thirty percent, the mode switch 305 of the transfer case is controlled to switch the high-speed two-wheel drive mode to the high-speed four-wheel drive mode or the low-speed drive mode, so that friction forces between tires and the ground are increased, thereby avoiding the vehicle from sliding down a hill.

Step S103-2, in the case that the engine is in a non-flameout state, the current speed of the vehicle sliding down a hill is acquired, and when conditions that the current drive mode is the high-speed two-wheel drive mode, the transmission gear is on the N/P gear, the slope is greater than the slope threshold, and the speed of sliding down a hill is higher than a speed threshold are satisfied at the same time, it is determined that the vehicle is in the working condition of being prone to sliding, and the mode switch 305 of the transfer case is controlled to switch the high-speed two-wheel drive mode to the high-speed four-wheel drive mode or the low-speed drive mode.

In the present implementation, when it is determined that the vehicle is in a park brake state and the engine is in the non-flameout state, the vehicle is still at risk of sliding down a hill even if the driver is in the vehicle. Therefore, in the present embodiment, the current speed of the vehicle sliding down a hill may be acquired by the ESP, and when the speed of sliding down a hill is greater than the speed threshold, it is proven that the vehicle has a tendency to sliding down a hill. At the moment, if the vehicle still satisfies the conditions that the current drive mode is the high-speed two-wheel drive mode, the transmission gear is on the N/P gear, and the slope is greater than the slope threshold at the same time, the mode switch 305 of the transfer case is controlled to switch the high-speed two-wheel drive mode to the high-speed four-wheel drive mode or the low-speed drive mode, so that friction forces between tires and the ground are increased, thereby avoiding the vehicle from sliding down a hill.

In the present implementation, preferably, the speed threshold may be set to be one km/h.

In an example, when driving the four-wheel drive vehicle for off-road driving in the high-speed two-wheel drive mode, the driver needs to temporarily park on a ramp with a slope of thirty-five percent, or an accompanier needs to get off the vehicle to explore a road, and the driver waits in the vehicle. At the moment, the driver pulls up the EPB switch and puts the transmission gear on the N/P gear. Since the vehicle only stops for a short time, and the driver is in a driving cab, the engine is usually in the non-flameout state. At the moment, if the vehicle has a sliding tendency, in the present embodiment, the current speed of the vehicle sliding down a hill and the slope of the position of the vehicle stopped on a hill may be acquired by the ESP, and after it is determined that the current slope has been greater than thirty percent and the current sliding speed has been higher than one km/h, the mode switch 305 of the transfer case is controlled to switch the high-speed two-wheel drive mode to the high-speed four-wheel drive mode or the low-speed drive mode, so that friction forces between tires and the ground are increased, thereby avoiding the vehicle from sliding down a hill.

In the present implementation, the automatic switching of a drive mode can be achieved without changing a brake system when the current parameter is in a state that a vehicle is prone to sliding down a hill by detecting the current parameter of the vehicle in real time when the vehicle is stopped on a hill, and a high-speed two-wheel drive mode with a weaker brake force is switched to a high-speed four-wheel drive mode or a low-speed drive mode with a stronger brake force, so that friction forces between tires and the ground are increased, thereby effectively reducing the risk of sliding down a hill.

In a feasible implementation, step S103-2 may include the specific steps:

Step S103-2-1, when the conditions that the current drive mode is the high-speed two-wheel drive mode, the transmission gear is on the N/P gear, the slope is greater than the slope threshold, and the speed of sliding down a hill is higher than the speed threshold are satisfied at the same time, it is determined, within a preset time, whether a signal that a brake pedal is triggered is received.

Step S103-2-2, when the signal that the brake pedal is triggered is not received within the preset time, the mode switch 305 of the transfer case is controlled to switch the high-speed two-wheel drive mode to the high-speed four-wheel drive mode or the low-speed drive mode, and it is prompted, by an instrument unit 306, that the current vehicle is in the high-speed four-wheel drive mode.

In the present implementation, in the case that the driver actively brakes when the vehicle has the sliding tendency, it is unnecessary to switch the drive mode. Therefore, it is determined, by detecting whether the brake pedal is triggered, whether the driver perform brake operation, and different brake strategies may be adopted according to different conditions by setting a time threshold on the basis. Specifically, when the signal that the brake pedal is triggered is received within the time threshold, it is proven that the driver has performed the brake operation, at the moment, it is unnecessary to switch the drive mode; and when the signal that the brake pedal is triggered is not received within the time threshold, that is, the it is too late for the driver to perform the brake operation, the mode switch 305 of the transfer case is controlled to switch the high-speed two-wheel drive mode to the high-speed four-wheel drive mode or the low-speed drive mode to stop sliding down a hill in time, thereby guaranteeing the safety of the vehicle.

In the present implementation, preferably, the preset time may be set to be two seconds.

In a feasible implementation, after step S103-1, the hill stop control method for the four-wheel drive vehicle may further include the following steps:

Step S104, after the vehicle is electrified, it is determined whether the engine is restarted.

Step S105, after it is determined that the engine is restarted, it is prompted, by the instrument unit 306, that the current vehicle is in the high-speed four-wheel drive mode or the low-speed drive mode.

In the present implementation, it is prompted to the driver by the instrument unit 306 that the switching of the drive mode of the vehicle has been completed, so that the driver can select a corresponding drive mode in the following driving according to an actual road condition. The situation that the driving experience of the driver is lowered due to driving the vehicle in a wrong drive mode since the driver does not know that the current mode has been switched is avoided.

In a feasible implementation, after the conditions that the current drive mode is the high-speed two-wheel drive mode, the transmission gear is on the N/P gear, the slope is greater than the slope threshold, and the speed of sliding down a hill is higher than the speed threshold are satisfied at the same time, and before it is determined whether the signal that the brake pedal is triggered is received, the hill stop control method for the four-wheel drive vehicle may further include the following steps:

step S106, a caution for sliding down a hill is given by the instrument unit 306 so as to remind the driver of preforming the brake operation.

In the present implementation, the caution for sliding down a hill may be, but is not limited to measures such as a caution word "the vehicle has a tendency to sliding down a hill, please step on the brake pedal" displayed on the display screen of the instrument unit 306, and/or sound-light alarm.

In a feasible implementation, the hill stop control method for the four-wheel drive vehicle may further include the following steps:

Step S107, when it is determined that the vehicle is in the park brake state, current weather information is acquired.

Step S108, when two conditions that the current weather information indicates a weather of being prone to sliding, and the current drive mode is the high-speed two-wheel drive mode are satisfied at the same time, the mode switch 305 of the transfer case is controlled to switch the high-speed two-wheel drive mode to the high-speed four-wheel drive mode or the low-speed drive mode.

It should be noted that the weather of being prone to sliding refers to weather, such as a rainy, snowy or hail weather, of being prone to causing a wet and slippery road.

In an example, when driving the four-wheel drive vehicle for off-road driving in the high-speed two-wheel drive mode and needing to temporarily park due to heavy rain, the driver pulls up the EPB switch to park. At the moment, the automatic switching of the drive mode may be performed by acquiring the current weather condition, i.e., heavy rain, of the vehicle by networking by means of a multimedia function of the vehicle, and satisfying, at the same time, the condition that the current drive mode is the high-speed two-wheel drive mode, and the mode switch 305 of the transfer case is controlled to switch the high-speed two-wheel drive mode to the high-speed four-wheel drive mode or the low-speed drive mode, so that the adhesive force of the vehicle is increased, thereby reducing the risk of sliding down a hill.

In the present implementation, the current weather condition of the vehicle may be acquired by networking by means of the multimedia function of the vehicle, and the automatic switching of the drive mode may be performed in a weather such as a rainy or snowy weather of being prone to causing the wet and slippery road by only satisfying, at the same time, the condition that the current drive mode is the high-speed two-wheel drive mode, so that the adhesive force of the vehicle is increased, thereby reducing the risk of sliding down a hill.

Figure 2:
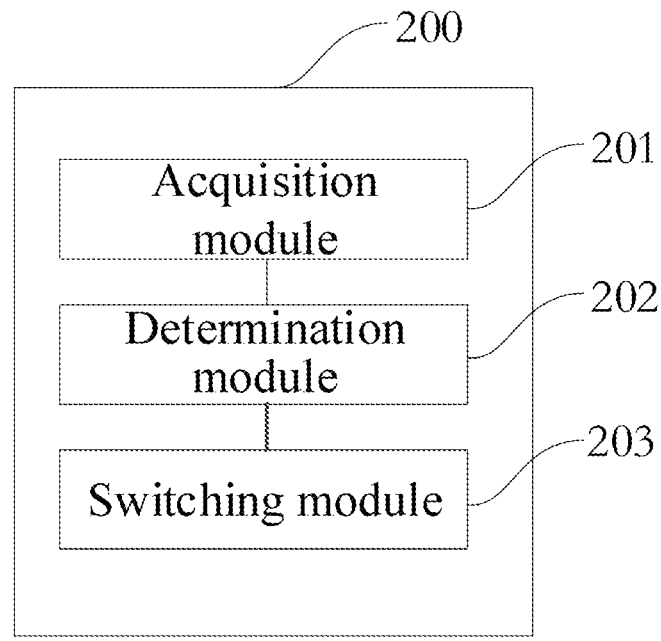
FIG. 2 is a schematic diagram of a functional module of a hill stop control apparatus for a four-wheel drive vehicle in an embodiment of the disclosure.

Based on the same inventive concept, with reference to FIG. 2, an embodiment of the disclosure provides a hill stop control apparatus 200 for a four-wheel drive vehicle, wherein the hill stop control apparatus 200 for the four-wheel drive vehicle includes:
- an acquisition module 201 configured to, when it is determined that a vehicle is in a park brake state, acquire the current parameter of the vehicle;
- a determination module 202 configured to, according to the current parameter, determine whether the vehicle is in a working condition of being prone to sliding; and
- a switching module 203 configured to, when it is determined that the vehicle is in the working condition of being prone to sliding, control a mode switch of a transfer case to switch the current drive mode to a high-speed four-wheel drive mode or a low-speed drive mode.

In a feasible implementation, the switching module 203 includes:
- a first switching sub-module configured to, in the case that an engine is in a flameout state, when conditions that the current drive mode is a high-speed two-wheel drive mode, the transmission gear is on an N/P gear, and the slope is greater than a slope threshold are satisfied at the same time, determine that the vehicle is in the working condition of being prone to sliding, and control the mode switch of the transfer case to switch the high-speed two-wheel drive mode to the high-speed four-wheel drive mode or the low-speed drive mode; and
- a second switching sub-module configured to, in the case that the engine is in a non-flameout state, when conditions that the current drive mode is the high-speed two-wheel drive mode, the transmission gear is on the N/P gear, the slope is greater than the slope threshold, and the speed of sliding down a hill is higher than a speed threshold are satisfied at the same time, determine that the vehicle is in the working condition of being prone to sliding, and control the mode switch of the transfer case to switch the high-speed two-wheel drive mode to the high-speed four-wheel drive mode or the low-speed drive mode.

In a feasible implementation, the second switching sub-module includes:
- a determination sub-module configured to, when the conditions that the current drive mode is the high-speed two-wheel drive mode, the transmission gear is on the N/P gear, the slope is greater than the slope threshold, and the speed of sliding down a hill is higher than the speed threshold are satisfied at the same time, determine, within a preset time, whether a signal that a brake pedal is triggered is received; and
- a switching sub-module configured to, when the signal that the brake pedal is triggered is not received within the preset time, control the mode switch of the transfer case to switch the high-speed two-wheel drive mode to the high-speed four-wheel drive mode or the low-speed drive mode, and prompt, by an instrument unit, that the current vehicle is in the high-speed four-wheel drive mode or the low-speed drive mode.

In a feasible implementation, the second switching sub-module further includes:
- a caution giving sub-module configured to, after the conditions that the current drive mode is the high-speed two-wheel drive mode, the transmission gear is on the N/P gear, the slope is greater than the slope threshold, and the speed of sliding down a hill is higher than the speed threshold are satisfied at the same time, and before it is determined whether the signal that the brake pedal is triggered is received, give a caution for sliding down a hill by the instrument unit so as to remind the driver of preforming the brake operation.

In a feasible implementation, the hill stop control apparatus 200 for the four-wheel drive vehicle further includes:
- a second determination module configured to, after the vehicle is electrified, determine whether the engine is restarted; and
- a prompt module configured to, after it is determined that the engine is restarted, prompt, by the instrument unit, that the current vehicle is in the high-speed four-wheel drive mode or the low-speed drive mode.

In a feasible implementation, the hill stop control apparatus 200 for the four-wheel drive vehicle further includes:

a weather acquisition module configured to, when it is determined that the vehicle is in the park brake state, acquire current weather information; and a second switching module configured to, when conditions that the current weather information indicates a weather of being prone to sliding, and the current drive mode is the high-speed two-wheel drive mode are satisfied at the same time, determine that the vehicle is in the working condition of being prone to sliding, and control the mode switch of the transfer case to switch the high-speed two-wheel drive mode to the high-speed four-wheel drive mode or the low-speed drive mode.

Figure 3:
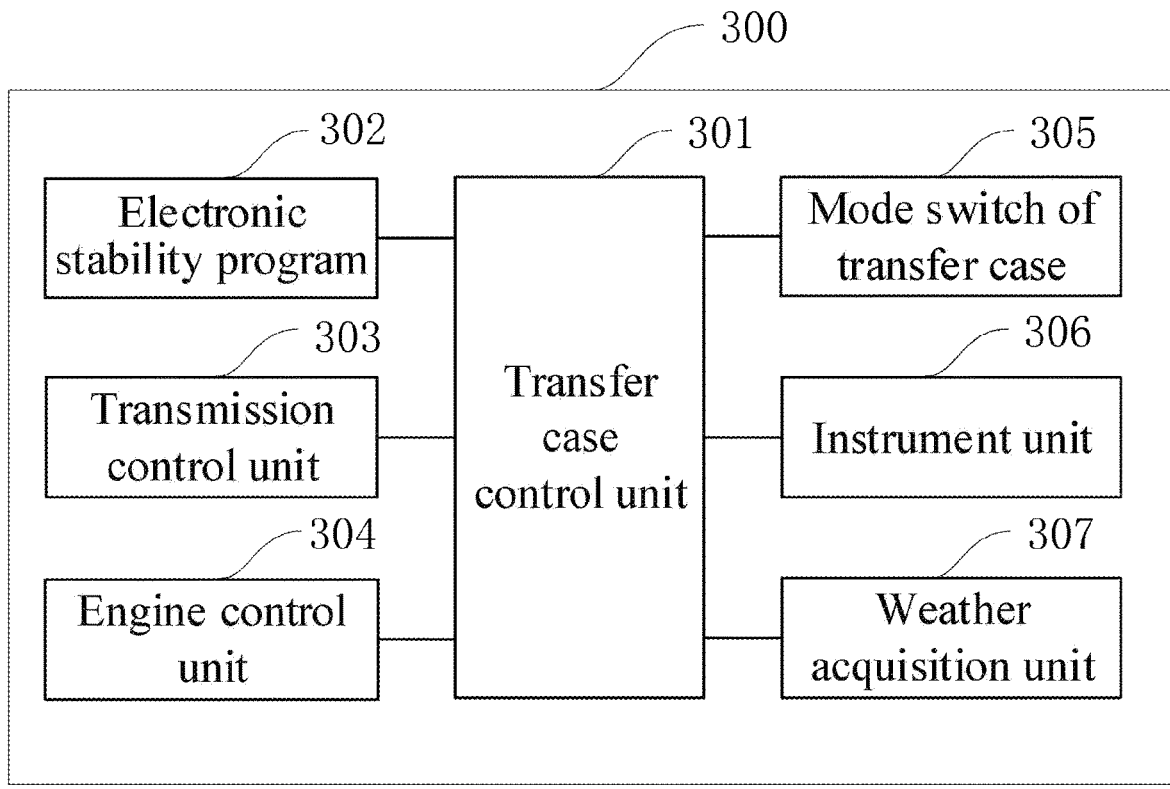
FIG. 3 is a schematic diagram of a connection relationship of a hill stop control system for a four-wheel drive vehicle in an embodiment of the disclosure.

Based on the same inventive concept, with reference to FIG. 3, an embodiment of the disclosure provides a hill stop control system 300 for a four-wheel drive vehicle, wherein the hill stop control system 300 for the four-wheel drive vehicle at least includes:

a transfer case control unit 301 as well as a mode switch 305 of a transfer case and a parameter acquisition apparatus which are respectively connected to the transfer case control unit 301, wherein the mode switch 305 of the transfer case is configured to switch a drive mode of the transfer case and transmit the current drive mode to the transfer case control unit 301, wherein the drive mode includes a high-speed two-wheel drive mode, a high-speed four-wheel drive mode and a low-speed drive mode;

the parameter acquisition apparatus is configured to acquire the current parameter of a vehicle and transmit the current parameter to the transfer case control unit, wherein the current parameter includes an engine state of the vehicle, the current drive mode of the transfer case, a transmission gear, a slope of a parking position, and a speed of sliding down a hill; and the transfer case control unit is configured to receive the current parameter of the vehicle and perform the hill stop control method for the four-wheel drive vehicle provided according to the first aspect of the disclosure so as to, when it is determined that the vehicle is in a working condition of being prone to sliding, control the mode switch of the transfer case to switch the current drive mode to the high-speed four-wheel drive mode or the low-speed drive mode.

In a feasible implementation, the parameter acquisition apparatus includes an electronic stability program 302, a transmission control unit 303 and an engine control unit 304 which are respectively connected to the transfer case control unit 301, wherein:

the electronic stability program 302 is configured to acquire slope information of a parking position of the vehicle and a speed of sliding down a hill and transmit the slope information and the speed of sliding down a hill to the transfer case control unit 301;

the transmission control unit 303 is configured to acquire a transmission gear of the vehicle and transmit the transmission gear to the transfer case control unit 301;

the engine control unit 304 is configured to acquire an engine state of the vehicle and transmit the engine state to the transfer case control unit 301; and the transfer case control unit 301 is configured to receive the current drive mode, the slope information, the transmission gear, and the engine state; is further configured to, in the case that an engine is in a flameout state, when conditions that the current drive mode is a high-speed two-wheel drive mode, the transmission gear is on an N/P gear, and the slope is greater than a slope threshold are satisfied at the same time, send an instruction of switching the high-speed two-wheel drive mode to the high-speed four-wheel drive mode or the low-speed drive mode to the mode switch 305 of the transfer case; and is further configured to, in the case that the engine is in a non-flameout state, acquire the speed of the vehicle sliding down a hill, and when conditions that the current drive mode is the high-speed two-wheel drive mode, the transmission gear is on the N/P gear, the slope is greater than the slope threshold, and the speed of sliding down a hill is higher than a speed threshold are satisfied at the same time, send an instruction of switching the high-speed two-wheel drive mode to the high-speed four-wheel drive mode or the low-speed drive mode to the mode switch 305 of the transfer case.

In a feasible implementation, the hill stop control system 300 for the four-wheel drive vehicle further includes:

an instrument unit 306 and a weather acquisition unit 307 which are connected to the transfer case control unit 301, wherein the weather acquisition unit 307 is configured to acquire weather information and transmit the weather information to the transfer case control unit 301;

the transfer case control unit 301 is configured to receive the weather information, and when conditions that the current drive mode is the high-speed two-wheel drive mode and the current weather information indicates a weather of being prone to sliding are satisfied at the same time, send an instruction of switching the high-speed two-wheel drive mode to the high-speed four-wheel drive mode or the low-speed drive mode to the mode switch 305 of the transfer case; is further configured to, when the conditions that the current drive mode is the high-speed two-wheel drive mode, the transmission gear is on the N/P gear, and the slope is greater than the slope threshold are satisfied at the same time, and the engine is restarted after the high-speed two-wheel drive mode is switched to the high-speed four-wheel drive mode or the low-speed drive mode, transmit a prompt instruction to the instrument unit 306; and is further configured to, after the conditions that the current drive mode is the high-speed two-wheel drive mode, the transmission gear is on the N/P gear, the slope is greater than the slope threshold, and the speed of sliding down a hill is higher than the speed threshold are satisfied at the same time, and before it is determined whether a signal that a brake pedal is triggered is received, transmit an instruction of giving a caution for sliding down a hill to the instrument unit 306; and the instrument unit 306 is configured to receive the prompt instruction and perform prompt operation according to the prompt instruction so as to prompt that the current vehicle is in the high-speed four-wheel drive mode; and is further configured to receive the instruction of giving a caution for sliding down a hill and perform a caution operation according to the instruction of giving a caution for sliding down a hill so as to remind the driver of performing brake operation.

Figure 4:
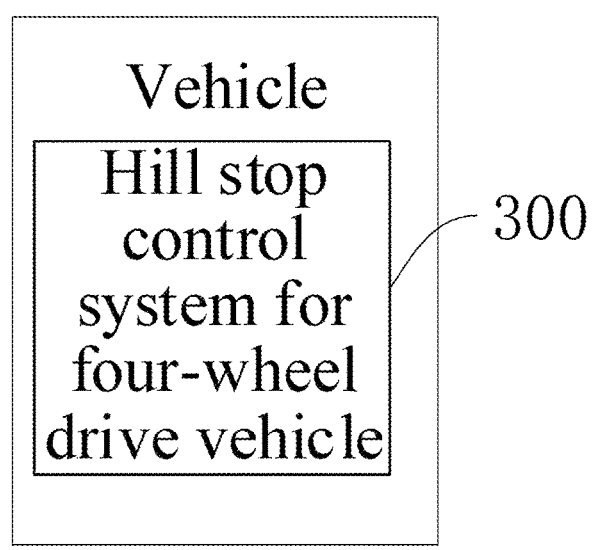
FIG. 4 is a schematic structural diagram of a vehicle in an embodiment of the disclosure.

Based on the same inventive concept, with reference to FIG. 4, an embodiment of the disclosure provides a vehicle at least including the hill stop control system 300 for the four-wheel drive vehicle provided in the third aspect of the embodiment of the disclosure. By the hill stop control system 300 for the four-wheel drive vehicle, the automatic switching of a drive mode can be achieved without changing a brake system when the current parameter is in a state that a vehicle is prone to sliding down a hill by detecting the current parameter of the vehicle in real time when the vehicle is stopped on a hill, and a high-speed two-wheel drive mode with a weaker brake force is switched to a high-speed four-wheel drive mode or a low-speed drive mode with a stronger brake force, so that friction forces between tires and the ground are increased, thereby effectively reducing the risk of sliding down a hill.

It should be understood by the skilled in the art that the embodiments of the disclosure may provide a method, apparatus or computer program product. Therefore, forms of a complete hardware embodiment, a complete software embodiment or a software and hardware aspect combined embodiment may be adopted in the embodiments of the disclosure. Moreover, a form of a computer program product executed on one or more computer available storage media (including, but not limited to a magnetic disk memory, a compact disc-read-only memory (CD-ROM) and an optical memory) including computer available program codes may be adopted in the embodiments of the disclosure.

The embodiments of the disclosure are described with reference to flow diagrams and/or block diagrams of the method, terminal device (system) and computer program product according to the embodiments of the disclosure. It should be understood that each flow and/or block in the flow diagrams and/or block diagrams as well as a combination of flows and/or blocks in the flow diagrams and/or block diagrams may be realized by computer program instructions. The computer program instructions may be provided to a general-purpose computer, a special-purpose computer, an embedded processor or processors of other programmable data processing terminal devices to generate a machine, so that an apparatus for realizing specified functions in one or more flows in the flow programs and/or one or more blocks in the block diagrams is generated through the instructions executed by the computer or the processors of other programmable data processing terminal devices.

These computer program instructions may also be stored in a computer readable memory capable of guiding the computer or other programmable data processing terminal devices to work in a specific way, so that the instructions stored in the computer readable memory generate a product including an instruction apparatus, and the instruction apparatus realizes the functions specified in the one or more flows in the flow diagrams and/or one or more blocks in the block diagrams.

These computer program instructions may also be loaded in the computer or other programmable data processing terminal devices, so that a series of operation steps are performed on the computer or other programmable data processing terminal devices to generate processing realized by the computer, and furthermore, the instructions executed on the computer or other programmable data processing terminal devices provide steps for realizing the specified functions in the one or more flows in the flow diagrams and/or one or more blocks in the block diagrams.

The apparatus embodiment described as above is only schematic, wherein the units described as separation components may be or not be physically separated, and components serving as units for display may be or not be physical units, that is, they may be located on the same place or distributed on a plurality of network units. Parts or all of the modules may be selected according to an actual demand to achieve the purpose of the solution in the present embodiment. The disclosure may be understood and implemented by those of ordinary skill in the art without creative efforts.

Each component embodiment of the disclosure may be implemented by hardware or a software module running on one or more processors or a combination thereof. It should be understood by the skilled in the art that parts or all of functions of parts or all of components in the computing and processing device in the embodiment of the disclosure may be implemented in practice by using a microprocessor or a digital signal processor (DSP). The disclosure may also be implemented as a part or all of device or apparatus programs (such as a computer program and a computer program product) for performing the method described herein. Such a program for implementing the disclosure may be stored in a computer readable medium or may have one or more signal forms. Such a signal may be downloaded from an Internet website or provided on a carrier signal or provided in any other forms.

Figure 5:
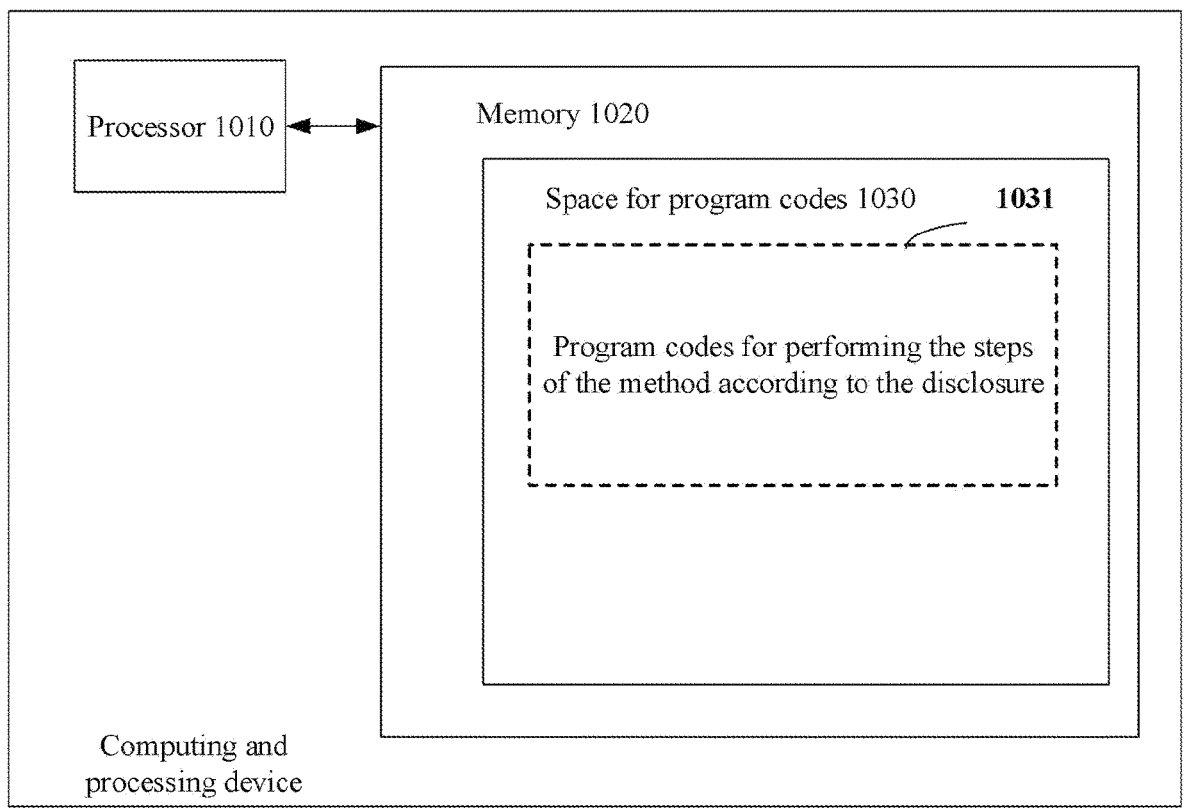
FIG. 5 is a structural block diagram of an electronic device provided in an embodiment of the disclosure.
Figure 6:
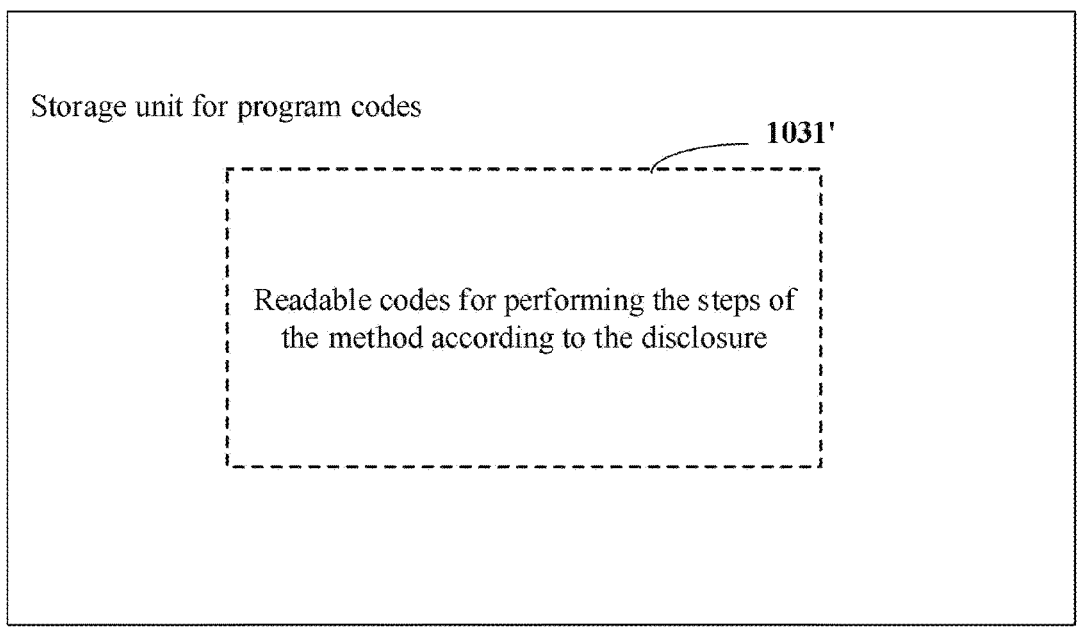
FIG. 6 is a schematic diagram of a hardware structure of an electronic device provided in an embodiment of the disclosure.

For example, FIG. 5 shows a computing and processing device capable of implementing the method according to the disclosure. The computing and processing device systemically includes a processor 1010 and a computer program products or computer readable medium in a form of a memory 1020. The memory 1020 may be an electronic memory such as a flash memory, an electrically erasable programmable read-only memory (EEPROM), an erasable programmable read-only memory (EPROM), a hard disk or a read-only memory (ROM). The memory 1020 has a storage space 1030 for program codes 1031 configured to perform any method steps in the above-mentioned method. For example, the storage space 1030 for program codes 1031 may include each of the program codes 1031 respectively configured to realize each of the steps of above method. These program codes may be read from one or more computer program products or written into the one or more computer program products. These computer program products include program code carriers such as a hard disk, a compact disc (CD), a storage card or a floppy disk. Such computer program products are usually portable or fixed storage units with reference to FIG. 6. The storage units may have storage segments, storage spaces, etc., which are disposed in way similar to that of the memory 1020 in the computing and processing device in FIG. 5. The program codes may be compressed in an appropriate form. Usually, the storage units include computer readable codes 1031', i.e., codes readable for a processor such as the processor 1010, and when the codes run on the computing and processing device, the computing and processing device is enabled to perform each of the steps of the method described as above.

Although the preferred embodiments of the disclosure have been described, those skilled in the art can make additional changes and modifications on these embodiments once they acquire the basic creative concept. Therefore, appended claims are intended to be explained to include the preferred embodiments and all the changes and modifications that fall within the scope of the disclosure.

Finally, it should be further noted that: relational terms such as first and second described herein are only used to distinguish one entity or operation from another one, but do not necessarily require or imply the presence of any such actual relationship or order between these entities or operations. Moreover, terms "includes", "including" or any other variants thereof are intended to cover non-excludable inclusion, so that a process, method, article or terminal device including a series of elements not only includes those elements, but also includes other elements not listed clearly, or further includes inherent elements of the process, method, article or terminal device. In the case that there are no more limitations, elements defined by the word "including a . . .

" do not exclude other same elements further existing in the process, method, article or terminal device including the elements.

The hill stop control method, apparatus and system for a four-wheel drive vehicle, and a vehicle provided in the disclosure have been described in detail as above. The principle and implementations of the disclosure have been described by applying specific examples in the disclosure, and the description for the above-mentioned embodiments is only intended to help the understanding of the method and a core concept thereof in the disclosure. At the same time, those of ordinary skill in the art may make modifications on specific implementations and application scope according to the concept of the disclosure. In conclusion, the contents of the description should not be understood as limitations of the disclosure.

What is claimed is:

1. A hill stop control method for a four-wheel drive vehicle, comprising:
   when it is determined that a vehicle is in a park brake state, acquiring a current parameter of the vehicle;
   determining whether the vehicle is in a working condition of being prone to sliding according to the current parameter; and
   when it is determined that the vehicle is in the working condition of being prone to sliding, controlling a mode switch of a transfer case to switch a current drive mode to a high-speed four-wheel drive mode or a low-speed drive mode.

2. The hill stop control method according to claim 1, wherein the current parameter comprises an engine state of the vehicle, the current drive mode of the transfer case, a transmission gear, a slope of a parking position, and a speed of sliding down a hill.

3. The hill stop control method according to claim 2, wherein the when it is determined that the vehicle is in the working condition of being prone to sliding, controlling the mode switch of the transfer case to switch the current drive mode to the high-speed four-wheel drive mode or the low-speed drive mode comprises:
   in the case that an engine is in a flameout state, determining that the vehicle is in the working condition of being prone to sliding when conditions that the current drive mode is a high-speed two-wheel drive mode, the transmission gear is on a neutral (N)/parking (P) gear, and the slope is greater than a slope threshold are satisfied at the same time, and controlling the mode switch of the transfer case to switch the high-speed two-wheel drive mode to the high-speed four-wheel drive mode or the low-speed drive mode; and
   in the case that the engine is in a non-flameout state, determining that the vehicle is in the working condition of being prone to sliding when conditions that the current drive mode is the high-speed two-wheel drive mode, the transmission gear is on the N/P gear, the slope is greater than the slope threshold, and the speed of sliding down the hill is higher than a speed threshold are satisfied at the same time, and controlling the mode switch of the transfer case to switch the high-speed two-wheel drive mode to the high-speed four-wheel drive mode or the low-speed drive mode.

4. The hill stop control method according to claim 3, wherein after determining that the vehicle is in the working condition of being prone to sliding when conditions that the current drive mode is the high-speed two-wheel drive mode, the transmission gear is on the N/P gear, and the slope is greater than the slope threshold are satisfied at the same time, and controlling the mode switch of the transfer case to switch the high-speed two-wheel drive mode to the high-speed four-wheel drive mode or the low-speed drive mode, the hill stop control method further comprises:
   after the vehicle is electrified, determining whether the engine is restarted; and
   after it is determined that the engine is restarted, prompting, by an instrument unit, that the current vehicle is in the high-speed four-wheel drive mode or the low-speed drive mode.

5. The hill stop control method according to claim 3, wherein determining that the vehicle is in the working condition of being prone to sliding when conditions that the current drive mode is the high-speed two-wheel drive mode, the transmission gear is on an N/P gear, the slope is greater than the slope threshold, and the speed of sliding down the hill is higher than the speed threshold are satisfied at the same time, and controlling the mode switch of the transfer case to switch the high-speed two-wheel drive mode to the high-speed four-wheel drive mode or the low-speed drive mode comprises:
   when the conditions that the current drive mode is the high-speed two-wheel drive mode, the transmission gear is on the N/P gear, the slope is greater than the slope threshold, and the speed of sliding down the hill is higher than the speed threshold are satisfied at the same time, determining that the vehicle is in the working condition of being prone to sliding, and determining whether a signal that a brake pedal is triggered is received within a preset time; and
   when the signal that the brake pedal is triggered is not received within the preset time, controlling the mode switch of the transfer case to switch the high-speed two-wheel drive mode to the high-speed four-wheel drive mode or the low-speed drive mode, and prompting, by the instrument unit, that the current vehicle is in the high-speed four-wheel drive mode or the low-speed drive mode.

6. The hill stop control method according to claim 1, further comprising:
   when it is determined that the vehicle is in the park brake state, acquiring current weather information; and
   when conditions that the current weather information indicates a weather of being prone to sliding, and the current drive mode is the high-speed two-wheel drive mode are satisfied at the same time, determining that the vehicle is in the working condition of being prone to sliding, and controlling the mode switch of the transfer case to switch the high-speed two-wheel drive mode to the high-speed four-wheel drive mode or the low-speed drive mode.

7. A hill stop control system for a four-wheel drive vehicle, comprising: a transfer case control unit, a mode switch of a transfer case, and a parameter acquisition apparatus, wherein the mode switch of the transfer case and the parameter acquisition apparatus are respectively connected to the transfer case control unit; wherein
   the mode switch of the transfer case is configured to switch a drive mode of the transfer case and transmit the current drive mode to the transfer case control unit, wherein the drive mode comprises a high-speed two-wheel drive mode, the high-speed four-wheel drive mode and the low-speed drive mode;
   the parameter acquisition apparatus is configured to acquire a current parameter of a vehicle and transmit the current parameter to the transfer case control unit; and the transfer case control unit is configured to receive the current parameter of the vehicle and perform the hill stop control method according to claim 1 so as to, when it is determined that the vehicle is in a working condition of being prone to sliding, control the mode switch of the transfer case to switch the current drive mode to the high-speed four-wheel drive mode or the low-speed drive mode.

8. The hill stop control system according to claim 7, wherein the parameter acquisition apparatus comprises:
an electronic stability program, a transmission control unit and an engine control unit, wherein the electronic stability program, the transmission control unit and the engine control unit are respectively connected to the transfer case control unit, wherein:
the electronic stability program is configured to acquire slope information of a parking position of the vehicle and a speed of sliding down a hill and transmit the slope information and the speed of sliding down the hill to the transfer case control unit;
the transmission control unit is configured to acquire a transmission gear of the vehicle and transmit the transmission gear to the transfer case control unit; and
the engine control unit is configured to acquire an engine state of the vehicle and transmit the engine state to the transfer case control unit.

9. A vehicle, comprising the hill stop control system for the four-wheel drive vehicle according to claim 7.

10. The hill stop control system according to claim 7, wherein the current parameter comprises an engine state of the vehicle, the current drive mode of the transfer case, a transmission gear, a slope of a parking position, and a speed of sliding down a hill.

11. The hill stop control system according to claim 10, wherein the transfer case control unit is further configured for:
in the case that an engine is in a flameout state, determining that the vehicle is in the working condition of being prone to sliding when conditions that the current drive mode is a high-speed two-wheel drive mode, the transmission gear is on a neutral (N)/parking (P) gear, and the slope is greater than a slope threshold are satisfied at the same time, and controlling the mode switch of the transfer case to switch the high-speed two-wheel drive mode to the high-speed four-wheel drive mode or the low-speed drive mode; and
in the case that the engine is in a non-flameout state, determining that the vehicle is in the working condition of being prone to sliding when conditions that the current drive mode is the high-speed two-wheel drive mode, the transmission gear is on the N/P gear, the slope is greater than the slope threshold, and the speed of sliding down the hill is higher than a speed threshold are satisfied at the same time, and controlling the mode switch of the transfer case to switch the high-speed two-wheel drive mode to the high-speed four-wheel drive mode or the low-speed drive mode.

12. The hill stop control system according to claim 11, wherein after determining that the vehicle is in the working condition of being prone to sliding when conditions that the current drive mode is the high-speed two-wheel drive mode, the transmission gear is on the N/P gear, and the slope is greater than the slope threshold are satisfied at the same time, and controlling the mode switch of the transfer case to switch the high-speed two-wheel drive mode to the high-speed four-wheel drive mode or the low-speed drive mode, the transfer case control unit is further configured for:
after the vehicle is electrified, determining whether the engine is restarted; and
after it is determined that the engine is restarted, prompting, by an instrument unit, that the current vehicle is in the high-speed four-wheel drive mode or the low-speed drive mode.

13. The hill stop control system according to claim 11, wherein the transfer case control unit is further configured for:
when the conditions that the current drive mode is the high-speed two-wheel drive mode, the transmission gear is on the N/P gear, the slope is greater than the slope threshold, and the speed of sliding down the hill is higher than the speed threshold are satisfied at the same time, determining that the vehicle is in the working condition of being prone to sliding, and determining whether a signal that a brake pedal is triggered is received within a preset time; and
when the signal that the brake pedal is triggered is not received within the preset time, controlling the mode switch of the transfer case to switch the high-speed two-wheel drive mode to the high-speed four-wheel drive mode or the low-speed drive mode, and prompting, by the instrument unit, that the current vehicle is in the high-speed four-wheel drive mode or the low-speed drive mode.

14. The hill stop control system according to claim 7, wherein the transfer case control unit is further configured for:
when it is determined that the vehicle is in the park brake state, acquiring current weather information; and
when conditions that the current weather information indicates a weather of being prone to sliding, and the current drive mode is the high-speed two-wheel drive mode are satisfied at the same time, determining that the vehicle is in the working condition of being prone to sliding, and controlling the mode switch of the transfer case to switch the high-speed two-wheel drive mode to the high-speed four-wheel drive mode or the low-speed drive mode.

15. The vehicle according to claim 9, wherein the parameter acquisition apparatus comprises:
an electronic stability program, a transmission control unit and an engine control unit, wherein the electronic stability program, the transmission control unit and the engine control unit are respectively connected to the transfer case control unit, wherein:
the electronic stability program is configured to acquire slope information of a parking position of the vehicle and a speed of sliding down a hill and transmit the slope information and the speed of sliding down the hill to the transfer case control unit;
the transmission control unit is configured to acquire a transmission gear of the vehicle and transmit the transmission gear to the transfer case control unit; and
the engine control unit is configured to acquire an engine state of the vehicle and transmit the engine state to the transfer case control unit.

\* \* \* \* \*